United States Patent [19]

Tejima et al.

[11] Patent Number: 5,353,072
[45] Date of Patent: Oct. 4, 1994

[54] ASPHERICAL SPECTACLE LENS

[75] Inventors: Yasuyuki Tejima; Moriyasu Shirayanagi; Yasunori Izawa, all of Tokyo, Japan

[73] Assignee: Asahi Kogaku Kogyo Kabushiki Kaisha, Tokyo, Japan

[21] Appl. No.: 11,500

[22] Filed: Jan. 29, 1993

[30] Foreign Application Priority Data

Jan. 31, 1992 [JP] Japan .................. 4-041874

[51] Int. Cl.$^5$ .......................... G02C 7/02; G02B 3/04
[52] U.S. Cl. .................. 351/159; 351/167; 359/708
[58] Field of Search ............... 351/159, 167

[56] References Cited

U.S. PATENT DOCUMENTS

| | | |
|---|---|---|
| 4,181,409 | 1/1980 | Whitney et al. . |
| 4,504,128 | 3/1985 | Guilino et al. . |
| 4,538,887 | 9/1985 | Bristol . |
| 4,613,217 | 9/1986 | Fuerter et al. . |
| 4,856,889 | 8/1989 | Guilino et al. . |
| 5,050,979 | 9/1991 | Shinohara . |
| 5,054,904 | 10/1991 | Bristol ................... 351/167 |

FOREIGN PATENT DOCUMENTS

| | | |
|---|---|---|
| 0093699 | 11/1983 | European Pat. Off. . |
| 53-94947 | 8/1978 | Japan . |
| 55-53314 | 4/1980 | Japan . |
| 57-10112 | 1/1982 | Japan . |
| 58-24112 | 2/1983 | Japan . |
| 58-195826 | 11/1983 | Japan . |
| 60-189725 | 9/1985 | Japan . |
| 62-296119 | 12/1987 | Japan . |
| 2289818 | 11/1990 | Japan . |

*Primary Examiner*—Edward K. Look
*Assistant Examiner*—James A. Larson
*Attorney, Agent, or Firm*—Sandler, Greenblum & Bernstein

[57] ABSTRACT

In an aspherical spectacle lens having a negative degree and an aspherical surface of rotational symmetry located on an object side, a surface power of the aspherical surface of rotational symmetry at a center portion located on an axis of rotational symmetry is substantially 0 diopter, and the aspherical surface of rotational symmetry is of an apparent convex shape.

7 Claims, 4 Drawing Sheets

ASPHERICAL SPECTACLE LENS

BACKGROUND OF THE INVENTION

1. Field of the Invention

The present invention relates to an aspherical spectacle (viewing) lens whose power (back vertex power) is a negative value, and more precisely it relates to a negative aspherical spectacle lens having a small thickness.

2. Description of Related Art

In a spectacle lens consisting of a spherical lens, once a surface power of the lens is determined, an allowable base curve which defines the lens profile is automatically determined in accordance with the degree of the lens to restrict aberration of the lens within a tolerance. As the power increases, the base curve becomes steep, resulting in a considerable thickness (total thickness and edge thickness) of the lens. Consequently, it is impossible to realize a thin spherical spectacle lens whose aberration is within the tolerance.

To solve the problem of the spherical spectacle lens discussed above, it is known to use an aspherical lens instead of the spherical lens to realize a thinner lens while preserving the same power. The spectacle lens, consisting of an aspherical lens having an aspherical surface located on the object side, can be made thinner than the spherical spectacle lens without increasing the aberration.

Nevertheless, in conventional aspherical spectacle lenses, it has been proposed that the base curve of the lens profile to be corrected by the aspherical surface be only slightly less steep than the base curve for the spherical lens. The inventors of the present invention have found that one cannot expect to remarkably reduce the lens thickness with such a base curve for the conventional aspherical spectacle lenses.

SUMMARY OF THE INVENTION

The primary object of the present invention is therefore to provide an aspherical spectacle lens whose thickness can be effectively reduced.

To achieve the object mentioned above, the improvement of the present invention is focused on an aspherical lens having an aspherical surface of rotational symmetry located on the object side, wherein there is substantially no surface power at the axis of rotational symmetry, so that the lens can be thinner, while effectively correcting the aberration.

According to the present invention, there is provided an aspherical spectacle lens having a negative power and an aspherical surface of rotational symmetry located on an object side at a center portion of the lens located on an axis of the rotational symmetry, wherein a surface power of the center portion of the aspherical surface is substantially identical to 0 diopter, and the aspherical surface of rotational symmetry is of an apparent convex shape.

"Surface power at a center portion is substantially 0" means that the appearance of the aspherical lens at the center portion is flat. More precisely, surface power at the center portion of the lens should be between $-0.125$ diopter and $+0.125$ diopter, because powers of a conventional spectacle lens are provided in such a manner that the minimum step of power change is given by 0.25 diopter. If the surface power is given within this range, the appearance of the center portion of the lens is deemed to be substantially flat.

With this structure, the aspherical spectacle lens of the present invention can be made thinner than a conventional aspherical spectacle lens as mentioned above, provided that both the aspherical spectacle lens of the present invention has the same negative power and is made of the same material as the conventional aspherical spectacle lens.

Preferably, the apparent convex aspherical surface of rotational symmetry has positive diopters of surface refracting power at positive radial distances from the axis thereof, so that a thin aspherical spectacle lens can be realized without increasing the aberration.

In the present invention, there is no limitation to the refractive index of the material of which the aspherical lens is made, but if a material having a high refractive index, e.g., not less than 1.65, is used, even an aspherical spectacle lens having a high negative power can be made thinner than conventional aspherical lenses.

The requirements of the aspherical surface can be optionally designed or determined in accordance with the power of the lens or the aberration to be corrected, etc., taking general properties of a spectacle lens into account.

So long as the aspherical surface has substantially no surface power at the center portion thereof located on the axis of the rotational symmetry, the technical effect of reduction of the thickness of the lens can be expected.

Although the surface of the aspherical lens located on the eye side is usually a spherical surface, the optical property of the lens surface on the eye side is not an object of the present invention.

The subject of the present invention is directed only to a spectacle lens whose power is negative and not positive. This is because if the lens surface of the spectacle lens, having a positive degree on the object side, has no surface power at the center portion thereof located on the axis of rotational symmetry, the lens surface on the eye side is impracticably convex to project toward an associated wearer's eye.

The present disclosure relates to the subject matter contained in Japanese Patent Application No. HEI 4-41874 (filed on Jan. 31, 1992) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Some embodiments of the present invention will be discussed below. In the following description, the power is expressed in diopters D.

Embodiment 1

Figure 1:
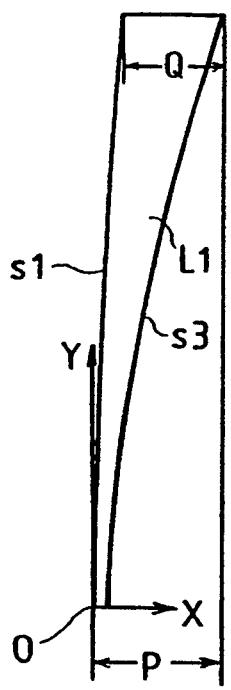
FIG. 1 is a sectional view of an upper half of an aspherical spectacle lens whose power is negative, with respect to an axis of rotational symmetry, according to a first embodiment of the present invention.
Figure 2:
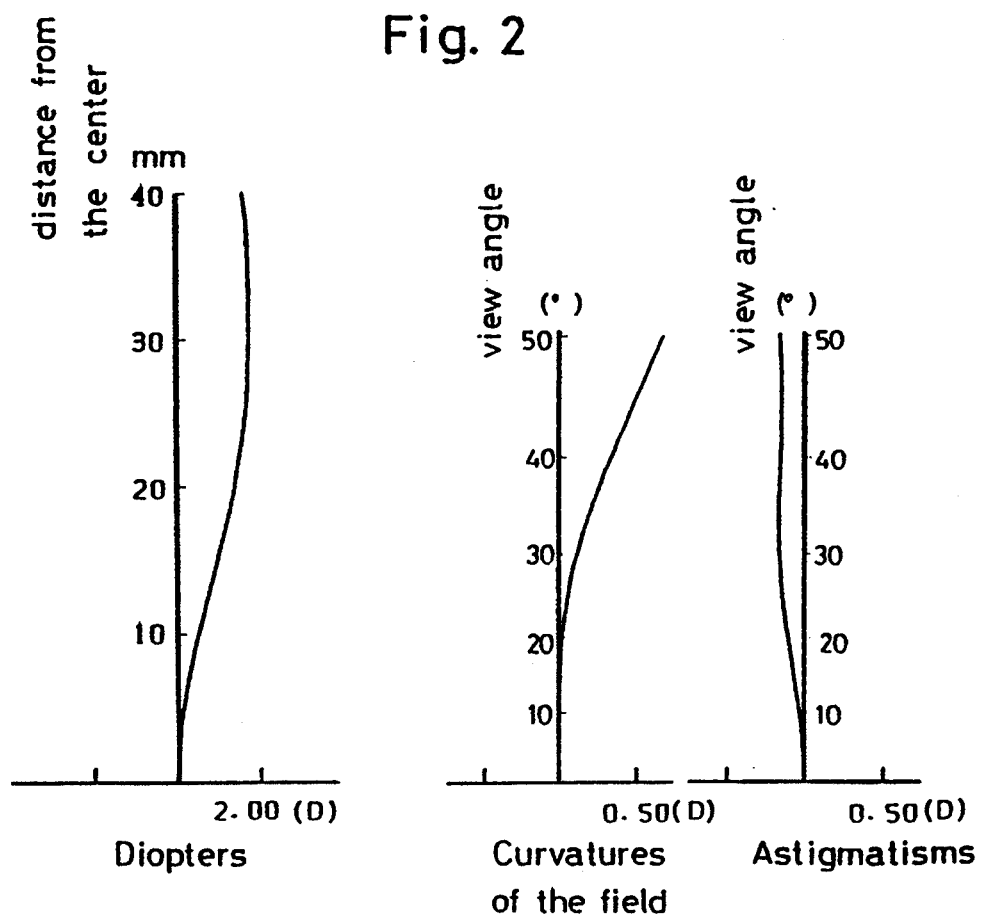
FIG. 2 shows diagrams of various aberrations of the aspherical spectacle lens shown in FIG. 1.
Figure 3:
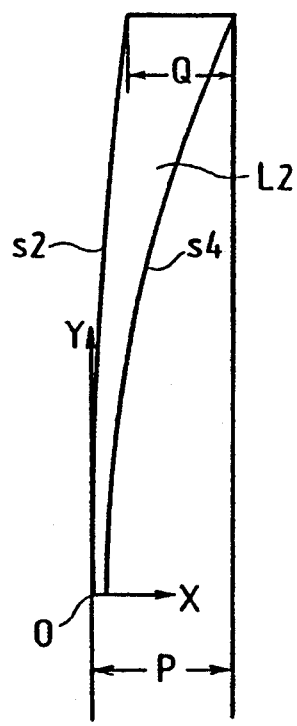
FIG. 3 is a sectional view of a comparative example of an upper half of an aspherical spectacle lens to be compared with the aspherical spectacle lens shown in FIG. 1.
Figure 4:
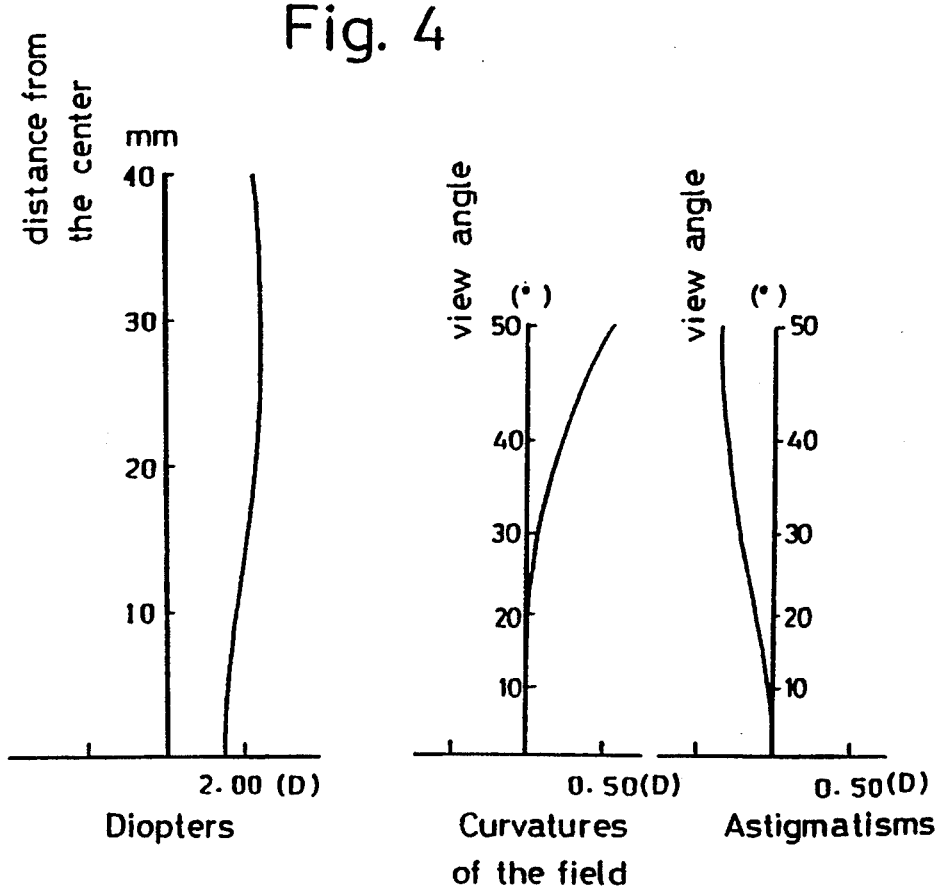
FIG. 4 shows diagrams of various aberrations of the aspherical spectacle lens shown in FIG. 3.
Figure 5:
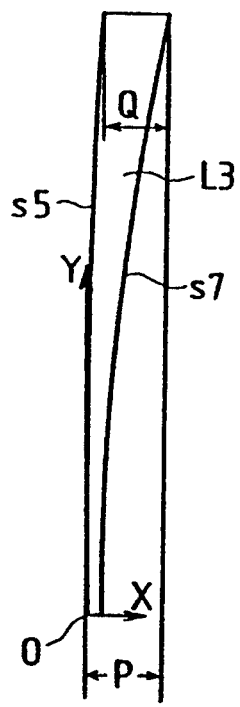
FIG. 5 is a sectional view of an upper half of an aspherical spectacle lens whose power is negative, with respect to an axis of rotational symmetry, according to a second embodiment of the present invention.
Figure 6:
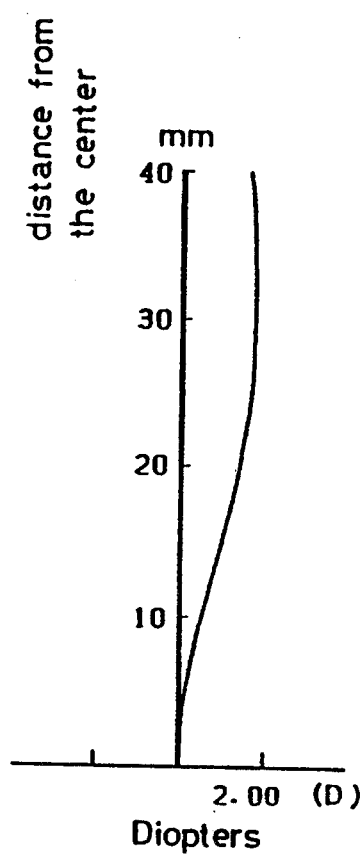
FIG. 6 shows diagrams of various aberrations of the aspherical spectacle lens shown in FIG. 5.
Figure 6:
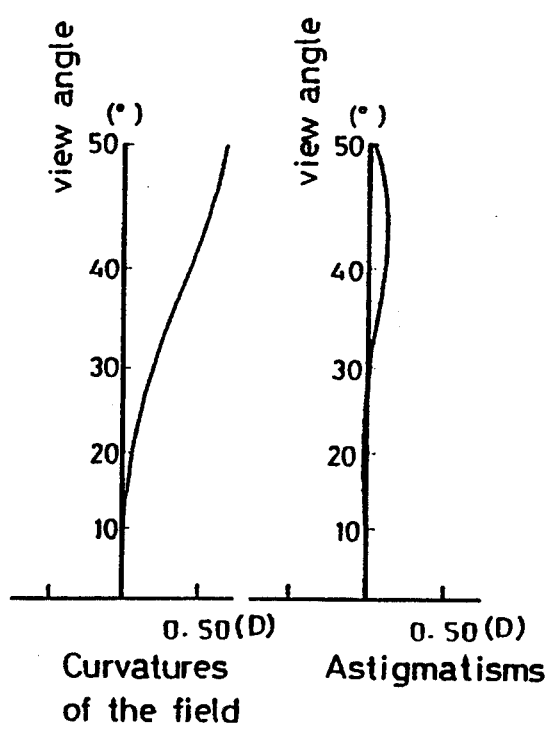
Figure 7:
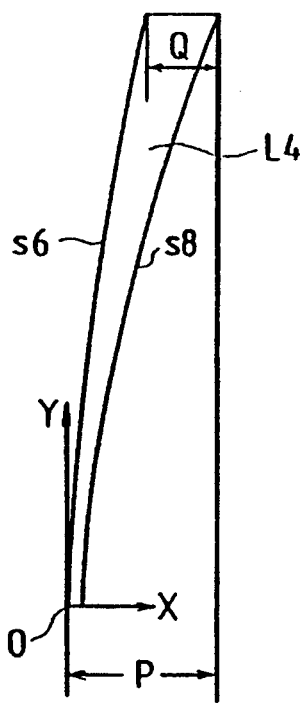
FIG. 7 is a sectional view of a comparative example of an upper half of an aspherical spectacle lens to be compared with the aspherical spectacle lens shown in FIG. 5; and, FIG. 8 shows diagrams of various aberrations of the aspherical spectacle lens shown in FIG. 7.
Figure 8:
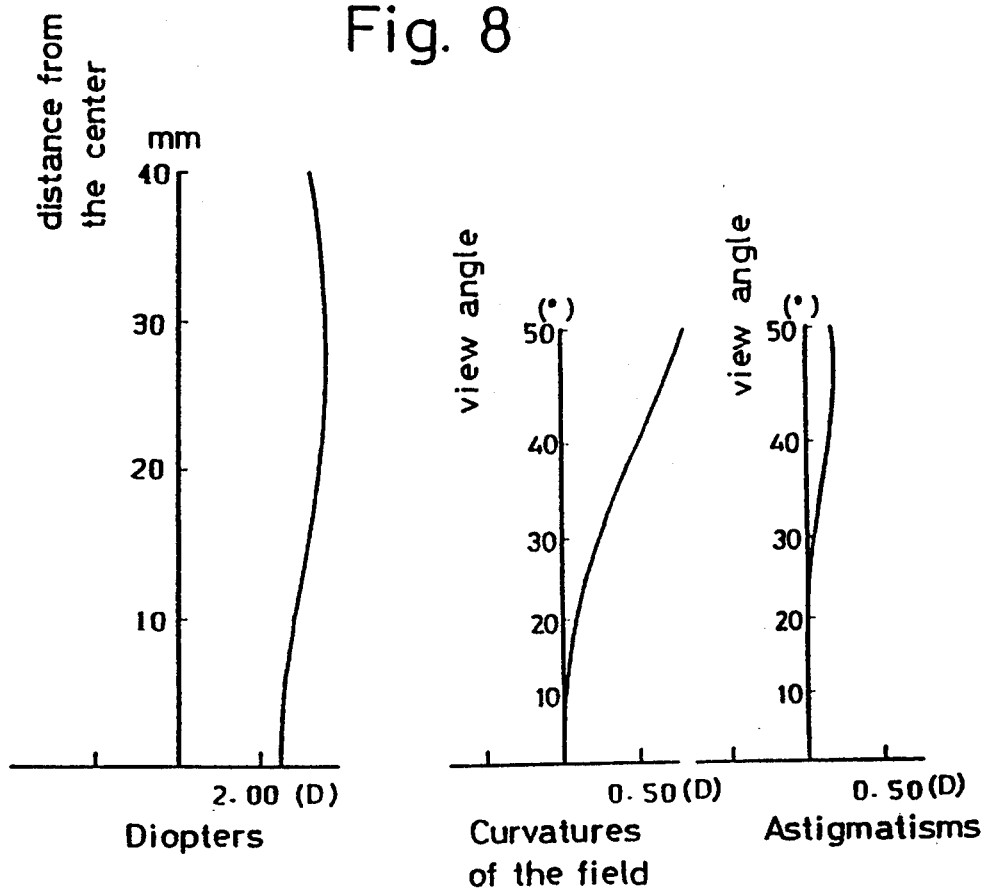

The first embodiment of the invention is applied to an aspherical spectacle lens L1 whose power is −6 D, as shown in FIG. 1. FIG. 3 shows an aspherical spectacle lens L2 for purposes of comparison with the aspherical spectacle lens L1. FIGS. 2 and 4 show distributions of the surface (refracting) powers D, curvatures of field AP, and astigmatisms AS of the aspherical spectacle lenses L1 and L2, respectively.

The coordinates are represented by an axis X of rotational symmetry of the aspherical lens L1 (or L2) and a plane Y passing through a vertex O of the aspherical lens L1 (or L2) and perpendicular to the axis X. In Table 1 that follows, the values in column Y indicate distances in the radial direction from the center of rotational symmetry, and the values in column X indicate distances of the aspherical surfaces s1 and s2 in the direction of the X axis from the Y plane.

TABLE 1

| | ASPHERICAL LENS L1 (PRESENT INVENTION) | | ASPHERICAL LENS L2 (COMPARATIVE EXAMPLE) | |
|---|---|---|---|---|
| Y(mm) | X(mm) | SURFACE POWER | X(mm) | SURFACE POWER |
| 0.0000 | 0.0000 | 0.0000 | 0.0000 | 1.4982 |
| 5.0000 | 0.0004 | 0.1375 | 0.0287 | 1.5863 |
| 10.0000 | 0.0068 | 0.5021 | 0.1181 | 1.8154 |
| 15.0000 | 0.0326 | 0.9693 | 0.2765 | 2.0965 |
| 20.0000 | 0.0950 | 1.3903 | 0.5145 | 2.3286 |
| 25.0000 | 0.2096 | 1.6577 | 0.8410 | 2.4498 |
| 30.0000 | 0.3867 | 1.7535 | 1.2608 | 2.4671 |
| 35.0000 | 0.6301 | 1.7333 | 1.7752 | 2.4248 |
| 40.0000 | 0.9393 | 1.5908 | 2.3831 | 2.2632 |

Note: The refractive index of the material of which the lens L1 (or L2) was made is 1.66 (d-line).

As can be seen from the data shown in Table 1 above, the surface refracting power of the rotationally symmetric aspherical surface s1, of the aspherical lens L1 of the present invention, is 0 D (Diopter) at the center portion thereof located on the axis X of rotational symmetry, and the apparent shape thereof is convex. Furthermore, the values of the surface power at positive radial distances, from the axis X of the lens L1 of the optical side surface, are positive. The values of the surface power increase from the axis X towards the peripheral edge thereof and slightly decrease at the peripheral edge portion.

Whereas, looking at the rotationally symmetric aspherical surface s2 of the aspherical lens L2 of the comparative example, the surface power D, at the center portion on the axis X, is not 0 D, but a large value similar to those at positive distances from the axis X.

The radii of curvature of the aspherical surfaces s1 and s2, located on the object side, and the spherical surfaces s3 and s4, located on the eye side of the aspherical lenses L1 and L2 side, are determined, so that the aspherical lenses L1 and L2 have an identical degree and a substantially same aberration property. The refracting power of the spherical surface s3 of the aspherical lens L1 of the present invention is 6.0 D, and that of the spherical surface s4 of the aspherical lens L2, of the comparative example, is 7.5 D, respectively.

In the first embodiment mentioned above, the total thickness P (largest thickness in the direction of the axis X) of the aspherical spectacle lens L1 according to the present invention was 8.54 mm. The thickness Q of the edge thereof was 7.60 mm, respectively; whereas, P and Q of the aspherical spectacle lens L2 according to the comparative example were 10.63 mm and 8.25 mm, respectively.

Embodiment 2

The second embodiment of the present invention is applied to an aspherical spectacle lens L3 whose power is −4 D.

FIGS. 5 through 8 correspond to FIGS. 1 through 4, respectively. L4 designates the aspherical spectacle lens as a second comparative example to be compared with the aspherical spectacle lens L3. The aspherical surfaces of rotational symmetry of the aspherical spectacle lenses L3 and L4 are indicated at s5 and s6, respectively. The spherical surfaces of the aspherical spectacle lenses L3 and L4 located on the eye side are indicated at s7 and s8, respectively.

Table 2 below corresponds to Table 1 in the first embodiment.

TABLE 2

| | ASPHERICAL LENS L3 (PRESENT INVENTION) | | ASPHERICAL LENS L4 (COMPARATIVE EXAMPLE) | |
|---|---|---|---|---|
| Y(mm) | X(mm) | SURFACE POWER | X(mm) | SURFACE POWER |
| 0.0000 | 0.0000 | 0.0000 | 0.0000 | 2.4951 |
| 5.0000 | 0.0004 | 0.1375 | 0.0475 | 2.5361 |
| 10.0000 | 0.0068 | 0.5021 | 0.1914 | 2.6471 |
| 15.0000 | 0.0326 | 0.9693 | 0.4362 | 2.7959 |
| 20.0000 | 0.0950 | 1.3903 | 0.7875 | 2.9405 |
| 25.0000 | 0.2096 | 1.6577 | 102515 | 3.0439 |
| 30.0000 | 0.3867 | 1.7535 | 1.8326 | 3.0875 |
| 35.0000 | 0.6301 | 1.7333 | 2.5336 | 3.0779 |
| 40.0000 | 0.9393 | 1.5908 | 3.3553 | 3.0380 |

Note: The refractive index of the material of which the lens L3 (or L4) was made is 1.66 (d-line).

As can be seen from the data shown in Table 2 above, the surface power of the rotationally symmetric aspherical surface s5 of the aspherical lens L3 of the present invention is 0 D at the center portion located on the axis X, and the apparent shape thereof is convex, similar to the first embodiment mentioned above. Furthermore, the values of the surface power at positive radial distances from the axis X of the lens L3 of the optical side surface are positive. The values of the surface power increase from the axis X towards the peripheral edge thereof and slightly decrease at the peripheral edge portion.

The radii of curvature of the aspherical surfaces s5 and s6, located on the object side, and the spherical surfaces s7 and s8, located on the eye side of the aspherical lenses L3 and L4, are determined, so that the aspherical lenses L3 and L4 have an identical power and substantially the same aberration property. The surface power of the spherical surface s7 of the aspherical lens L3 of the present invention was 4.0 D, and that of the spherical surface s8 of the aspherical lens L4 of the comparative example was 6.5 D, respectively.

In the second embodiment of the invention mentioned above, the total thickness P of the aspherical spectacle lens L3, according to the present invention, was 5.93 mm, and the thickness Q of the edge thereof was 4.99 mm, respectively; whereas, P and Q of the aspherical spectacle lens L4, according to the comparative example, were 9.22 mm and 5.54 mm, respectively.

As can be understood from the above discussion, according to the present invention, an aspherical spectacle lens having a negative power can be made to be thinner without increasing aberration. Consequently, the invention can be advantageously applied particularly to a spectacle lens having a high negative power, which would otherwise be thick. The thin spectacle lens also contributes to a good appearance of the spectacles. This meets the recent trend of wearers who wish thinner spectacles, and decreases the amount of material required to make the lens.

The aberrations shown in the embodiments described above only disclose a few examples. A person skilled in the art can easily design different aberrations as needed or requested without departing from the scope of the present invention.

We claim:

1. An aspherical spectacle lens having a negative power and an aspherical surface of rotational symmetry located on an object side of the lens, a surface power of the aspherical surface of rotational symmetry, at a center portion located on an axis of rotational symmetry, being substantially 0 diopter, the aspherical surface of rotational symmetry being generally of a convex shape and having positive diopter powers of surface power at positive radial distances from the axis thereof, said positive diopter powers increasing with distance from the axis of rotational symmetry towards a pheripheral edge of the lens and decreasing, relatively, at a peripheral edge portion of the lens, said peripheral edge portion being approximately 30 mm to 40 mm from the axis of rotational symmetry, and said positive diopter powers having a maximum surface power of 1.7535 diopter.

2. An aspherical spectacle lens according to claim 1, wherein said lens is made of a material whose refractive index is not less than 1.65.

3. An aspherical spectacle lens having an aspherical surface of rotational symmetry located on an object side of the lens, said aspherical surface of rotational symmetry having positive diopter powers of surface power at positive radial distances from an axis of rotational symmetry in accordance with the following table:

| Radial Distance (mm) | Surface Power (Diopters) |
|---|---|
| 0.0 | 0.000 |
| 10.0 | 0.5021 |
| 20.0 | 1.3903 |
| 30.0 | 1.7535 |
| 40.0 | 1.5908 |

4. An aspherical spectacle lens according to claim 3, said lens having a negative power of −6 diopter.

5. An aspherical spectacle lens according to claim 3, said lens having a negative power of −4 diopter.

6. An aspherical spectacle lens according to claim 3, said aspherical surface of rotational symmetry being generally of a convex shape.

7. An aspherical spectacle lens according to claim 3, said lens being made of a material whose refractive index is not less than 1.65.

* * * * *

UNITED STATES PATENT AND TRADEMARK OFFICE
CERTIFICATE OF CORRECTION

PATENT NO. : 5,353,072

DATED : October 4, 1994

INVENTOR(S) : Yasuyuki TEJIMA et al.

It is certified that error appears in the above-indentified patent and that said Letters Patent is hereby corrected as shown below:

At column 5, line 35 (claim 1, line 11), change "pheripheral" to ---peripheral---.

Signed and Sealed this

Fourth Day of July, 1995

Attest:

BRUCE LEHMAN

Attesting Officer     Commissioner of Patents and Trademarks